United States Patent
Ramamurthy et al.

(10) Patent No.: US 10,264,305 B2
(45) Date of Patent: Apr. 16, 2019

(54) DELIVERY OF ENCODED MEDIA CONTENT

(75) Inventors: Arjun Ramamurthy, Glendale, CA (US); Kai Tao Huang, San Gabriel, CA (US)

(73) Assignee: TWENTIETH CENTURY FOX FILM CORPORATION, Los Angeles, CA (US)

( * ) Notice: Subject to any disclaimer, the term of this patent is extended or adjusted under 35 U.S.C. 154(b) by 784 days.

(21) Appl. No.: 12/715,970

(22) Filed: Mar. 2, 2010

(65) Prior Publication Data

US 2011/0219322 A1 Sep. 8, 2011

(51) Int. Cl.
| | |
|---|---|
| *G06F 15/16* | (2006.01) |
| *G06F 3/048* | (2013.01) |
| *H04N 21/262* | (2011.01) |
| *H04N 21/25* | (2011.01) |
| *H04N 21/2668* | (2011.01) |
| *H04N 21/472* | (2011.01) |
| *H04N 21/658* | (2011.01) |

(52) U.S. Cl.
CPC ..... *H04N 21/26258* (2013.01); *H04N 21/252* (2013.01); *H04N 21/2668* (2013.01); *H04N 21/472* (2013.01); *H04N 21/658* (2013.01)

(58) Field of Classification Search
CPC ...... G06F 3/00; G06F 3/0482; G06F 17/3089; G06F 17/30849; H04N 21/4622; H04N 21/4316; H04N 21/812
USPC ................. 715/719, 764; 709/219
See application file for complete search history.

(56) References Cited

U.S. PATENT DOCUMENTS

| | | | |
|---|---|---|---|
| 4,297,729 A | 10/1981 | Steynor et al. | |
| 6,002,393 A | 12/1999 | Hite et al. | |
| 6,169,542 B1 * | 1/2001 | Hooks et al. | 715/719 |
| 6,229,524 B1 | 5/2001 | Chernock et al. | |
| 6,335,737 B1 | 1/2002 | Grossman et al. | |
| 6,463,420 B1 * | 10/2002 | Guidice et al. | 705/28 |
| 6,535,585 B1 * | 3/2003 | Hanson et al. | 379/88.12 |
| 6,763,299 B2 * | 7/2004 | Jones | 701/465 |
| 6,768,499 B2 | 7/2004 | Miller et al. | |
| 6,834,308 B1 | 12/2004 | Ikezoye et al. | |

(Continued)

FOREIGN PATENT DOCUMENTS

| | | |
|---|---|---|
| JP | 2003/330840 | 11/2003 |
| JP | 2007/013909 | 1/2007 |

(Continued)

OTHER PUBLICATIONS

Canadian Office Action dated Dec. 19, 2016 for CA Application No. 2,791,909 filed on Mar. 2, 2011.

(Continued)

*Primary Examiner* — Sang H Kim
(74) *Attorney, Agent, or Firm* — Gates & Cooper LLP (57) ABSTRACT

A, method, apparatus, system, computer readable medium, and article of manufacture provide the ability to deliver a media content deliverable. Media content is selected. One or more clients that will receive the selected media content are selected. Independently from additional user input, one or more files are automatically and dynamically selected based on the selected media content and one or more selected clients. The selected files are scheduled for delivery to the clients. Delivery of the one or more files to the selected one or more clients is then confirmed.

27 Claims, 7 Drawing Sheets

(56) References Cited

U.S. PATENT DOCUMENTS

| | | | |
|---|---|---|---|
| 6,928,463 B1* | 8/2005 | Tene | H04L 12/2856 370/356 |
| 7,110,664 B2 | 9/2006 | Yogeshwar et al. | |
| 7,133,925 B2* | 11/2006 | Mukherjee et al. | 709/231 |
| 7,177,825 B1* | 2/2007 | Borders et al. | 705/26.81 |
| 7,444,000 B2 | 10/2008 | Rhoads | |
| 7,505,929 B2* | 3/2009 | Angert et al. | 705/26.3 |
| 7,578,002 B2 | 8/2009 | Risan et al. | |
| 7,634,780 B2* | 12/2009 | Rhoten et al. | 719/328 |
| 7,639,740 B2 | 12/2009 | Weigand et al. | |
| 7,798,417 B2* | 9/2010 | Snyder et al. | 235/494 |
| 7,886,228 B2 | 2/2011 | Balabanovic et al. | |
| 8,006,189 B2 | 8/2011 | Dachs | |
| 8,103,965 B2* | 1/2012 | Roberts et al. | 715/772 |
| 8,200,772 B2* | 6/2012 | Saunders et al. | 709/213 |
| 8,621,542 B2* | 12/2013 | Klamer et al. | 725/118 |
| 2003/0185301 A1* | 10/2003 | Abrams et al. | 375/240.12 |
| 2003/0191816 A1* | 10/2003 | Landress | G06Q 30/02 709/219 |
| 2003/0206717 A1* | 11/2003 | Yogeshwar | H04N 5/76 386/328 |
| 2004/0024812 A1 | 2/2004 | Park et al. | |
| 2004/0032348 A1* | 2/2004 | Lai et al. | 341/50 |
| 2004/0172376 A1* | 9/2004 | Kobori | H04L 29/12594 |
| 2004/0246376 A1* | 12/2004 | Sekiguchi et al. | 348/468 |
| 2005/0177745 A1* | 8/2005 | Oswald | H04L 9/00 726/5 |
| 2006/0184431 A1* | 8/2006 | Rosenberg et al. | 705/26 |
| 2006/0278064 A1* | 12/2006 | Lourdeaux | 84/609 |
| 2007/0050336 A1* | 3/2007 | Bugir et al. | 707/3 |
| 2007/0192192 A1* | 8/2007 | Haberman | G06F 17/30017 705/14.1 |
| 2007/0202923 A1* | 8/2007 | Jung | H04L 67/16 455/566 |
| 2007/0250761 A1* | 10/2007 | Bradley et al. | 715/500.1 |
| 2008/0017722 A1* | 1/2008 | Snyder et al. | 235/494 |
| 2008/0170622 A1* | 7/2008 | Gordon | H04N 21/23412 375/240.18 |
| 2008/0184098 A1* | 7/2008 | Chen et al. | 715/202 |
| 2009/0106653 A1* | 4/2009 | Lee et al. | 715/273 |
| 2009/0222580 A1* | 9/2009 | Stasi | G06Q 10/0637 709/240 |
| 2009/0327079 A1* | 12/2009 | Parker et al. | 705/14.55 |
| 2010/0138553 A1* | 6/2010 | Yuan | G06Q 30/02 709/230 |
| 2010/0153520 A1* | 6/2010 | Daun | G11B 27/034 709/218 |
| 2010/0192175 A1 | 7/2010 | Bachet et al. | |
| 2011/0126104 A1* | 5/2011 | Woods et al. | 715/719 |
| 2011/0219308 A1 | 9/2011 | Ramamurthy et al. | |
| 2012/0233031 A1* | 9/2012 | Chang et al. | 705/27.1 |
| 2013/0103606 A1* | 4/2013 | Holliday | 705/333 |
| 2014/0067665 A1* | 3/2014 | Paletz et al. | 705/40 |
| 2016/0359951 A1* | 12/2016 | Basu | G06Q 30/02 |

FOREIGN PATENT DOCUMENTS

| | | |
|---|---|---|
| JP | 2008/278121 | 11/2008 |
| KR | 10-0722992 | 5/2007 |
| WO | 2007/011537 | 1/2007 |

OTHER PUBLICATIONS

International Search Report dated Oct. 14, 2011, International application No. PCT/US2011/026880, International filing date Mar. 2, 2011.

International Search Report dated Oct. 31, 2011, International application No. PCT/US2011/026875, International filing date Mar. 2, 2011.

* cited by examiner

Delivery Queue

Work Order [      ]   Purchase Order [      ]   Market [n/a ▼]
Title       [      ]   WPR Number     [      ]   Season [      ]
File Path   [      ]   Client         [n/a ▼]    Mechanism [n/a ▼]

[Search]

Total 9 record(s) found

Viewing 1 to 9 of 9 total items [Start][Previous 50][Next 50][End]

| Priority | Package | WO# PO# | Market | Client | Mechanism | Status | Moving Progress | Delivery Progress | File Path |
|---|---|---|---|---|---|---|---|---|---|
| 500 | Xbox, ModernFamily. | Resupply | Xbox | | aspera scp | completed | 100% | 100% | W:\Deliverables\ |
| 500 | Amazon_standard, MaryTylerMoore. | RESUPPLY | Amazon_standard | | aspera scp | completed | 100% | 100% | W:\Deliverables\ |
| 500 | Amazon_standard, MaryTylerMoore. | RESUPPLY | Amazon_standard | | aspera scp | failed to move [restart][cancel] 702 704 | 100% | 0% | W:\Deliverables\ |
| 500 | Amazon_standard, MaryTylerMoore. | RESUPPLY | Amazon_standard | | aspera scp | failed to move [restart][cancel] | 0% | 0% | W:\Deliverables\ |
| 500 | Amazon_standard, MaryTylerMoore. | RESUPPLY | Amazon_standard | | aspera scp | completed | 100% | 100% | W:\Deliverables\ |

Viewing 1 to 9 of 9 total items [Start][Previous 50][Next 50][End]

DELIVERY OF ENCODED MEDIA CONTENT

CROSS-REFERENCE TO RELATED APPLICATIONS

This application is related to the following co-pending and commonly-assigned patent application, which application is incorporated by reference herein:

U.S. patent application Ser. No. 12/715,989, entitled "PRE-PROCESSING AND ENCODING MEDIA CONTENT", by ARJUN RAMAMURTHY, GEOFFREY ANTON BLODER, and JAMES FRANK HELIKER, filed on the same date herewith.

BACKGROUND OF THE INVENTION

1. Field of the Invention

The present invention relates generally to delivering file based media content, and in particular, to a method, apparatus, system, article of manufacture, and computer readable medium for efficiently delivering different media content deliverables to multiple entities.

2. Description of the Related Art

File based media content may be provided/delivered to a variety of different entities for viewing or further modifications. Each of the different entities may have different requirements for the file-based media content relating to both the media content itself as well as the specification/format of the media content. Further, once such content has been created, the content must be delivered to the different entities. The prior art process for selecting the relevant media content, scheduling such content for delivery, and confirming delivery of the content is a manual and time consuming task. To better understand these prior art delivery problems, a description of prior art media content processing and delivery is useful.

Different entities or different receiving mediums may have different requirements for the file-based media content. For example, a first web based entity that is going to display/stream the media content across the Internet to end-users may require the media content in MPEG2 (motion pictures expert group version 2) while a second web based entity may require the media content in MPEG-4. In another example, a domestic broadcasting entity may require the media content in NTSC (national television system committee) 4×3 aspect ratio, 30 fps (frames per second) while a foreign broadcasting entity may require PAL (phase alternating line) 16×9 aspect ratio at 25 fps. Further, the content itself may be modified or edited per the requirements of the receiving entity (e.g., shorter/no commercials, or no black bars on a 4×3 formatted program, etc.). The different versions of the media content is referred to herein as a deliverable.

Such media content is obtained/created using a variety of mechanisms (e.g., film, video, computer generated, etc.) and stored onto tape. The media content may then be transformed/encoded, transcoded into a file-based deliverable. The various deliverables are then manually delivered to the desired recipient(s).

Figure 1:
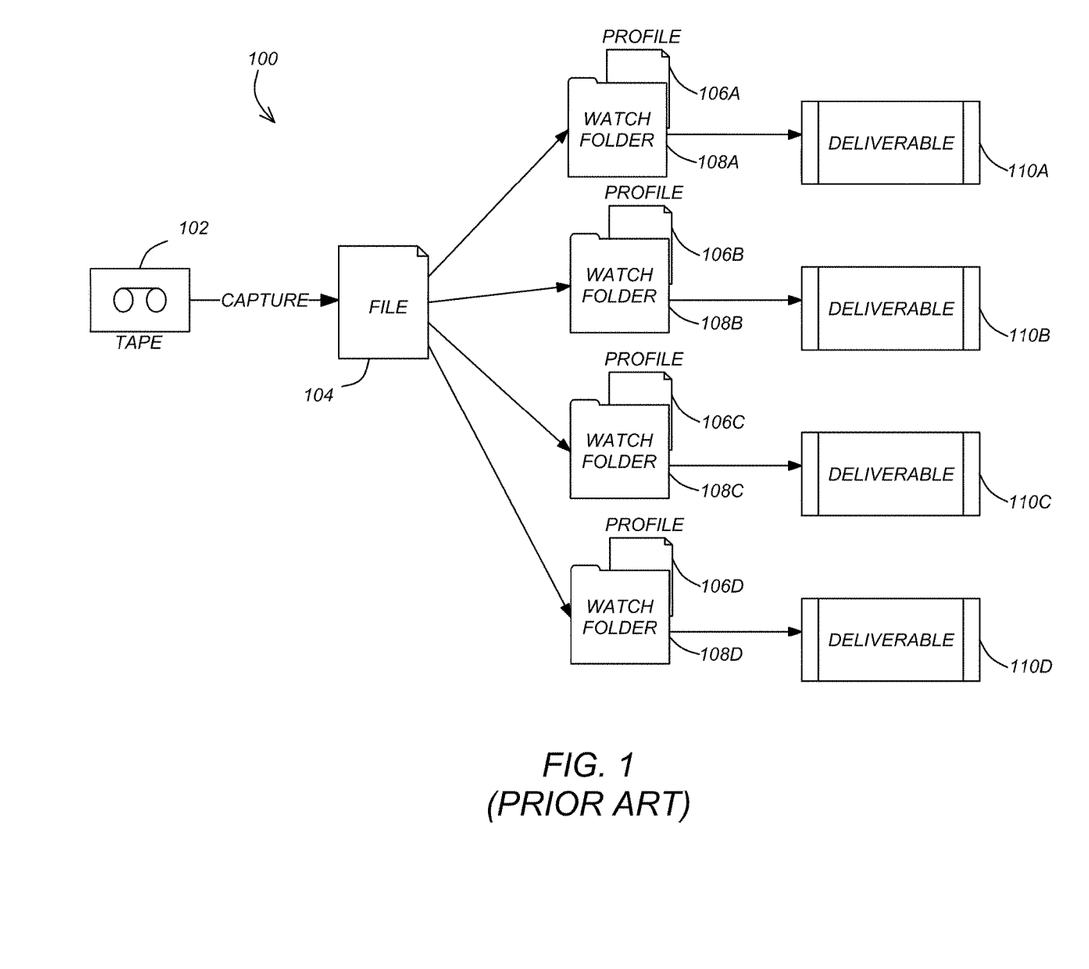
FIG. 1 illustrates the prior art process for creating a deliverable.

The prior art transformation of the master (i.e., media content on tape) into a file-based deliverable is a time-consuming and inefficient process. FIG. 1 illustrates the prior art process for creating a deliverable. The tape 102 is first processed via a capture tool that transforms the media content into a file 104. A variety of products from different manufacturers (e.g., from Digital Rapids™, AmberFin™, etc.) may be used to perform the capture. Once in a file 104, the media content can be used to feed multiple different deliverables 110.

To provide a deliverable 110, the source file must be transcoded from the master into the deliverable format. To configure the transcoder, a profile 106 for each deliverable 110 is established. A profile 106 includes configuration parameters and determines what is needed in the file 104 to be used as the deliverable 110. Such configuration parameters may include height and width, bit rate, type of compression, compression ratio, etc. As described above, a television show configured for broadcast viewing may be very different than that for Internet viewing (e.g., media content may be shot with very dark lighting for broadcast that would not be acceptable for Internet viewing). Accordingly, the television show would need one deliverable 110 for the particular broadcast viewing and a second deliverable 110 for the particular Internet viewing.

Each different profile 106 is associated with a single watch folder 108. When a user desires to generate a particular deliverable 110, the user drops the file 104 into the desired watch folder 108. The profile 106 is then automatically applied to the file 104 to generate/encode/transcode the deliverable 110. To activate another profile 106 and produce a different deliverable 110, the user must manually drop the file 104 into a different watch folder 108. For example, a user may drop the file 104 into watch folder 108C. Profile 106C would then be applied to generate/encode/transcode deliverable 110C. To create a different deliverable 110B, the user would drop the file 104 into watch folder 108B. Accordingly, users need to maintain a knowledgebase regarding which watch folder 108 corresponds to which profile 106 and manually move a file 104 into a particular watch folder 108 in order to generate the desired deliverable 110. The process 100 consumes the entire file 104 and produces a deliverable 110 as a single file.

Once the deliverable 110 has been created, it must be delivered to the various clients. Some prior art mechanisms utilized tape which was manually delivered to the recipients. Alternatively, many entities have migrated towards an electronic and file based transfer system where files are digitally created and either manually delivered on tape or electronically transmitted to the recipient.

Figure 2:
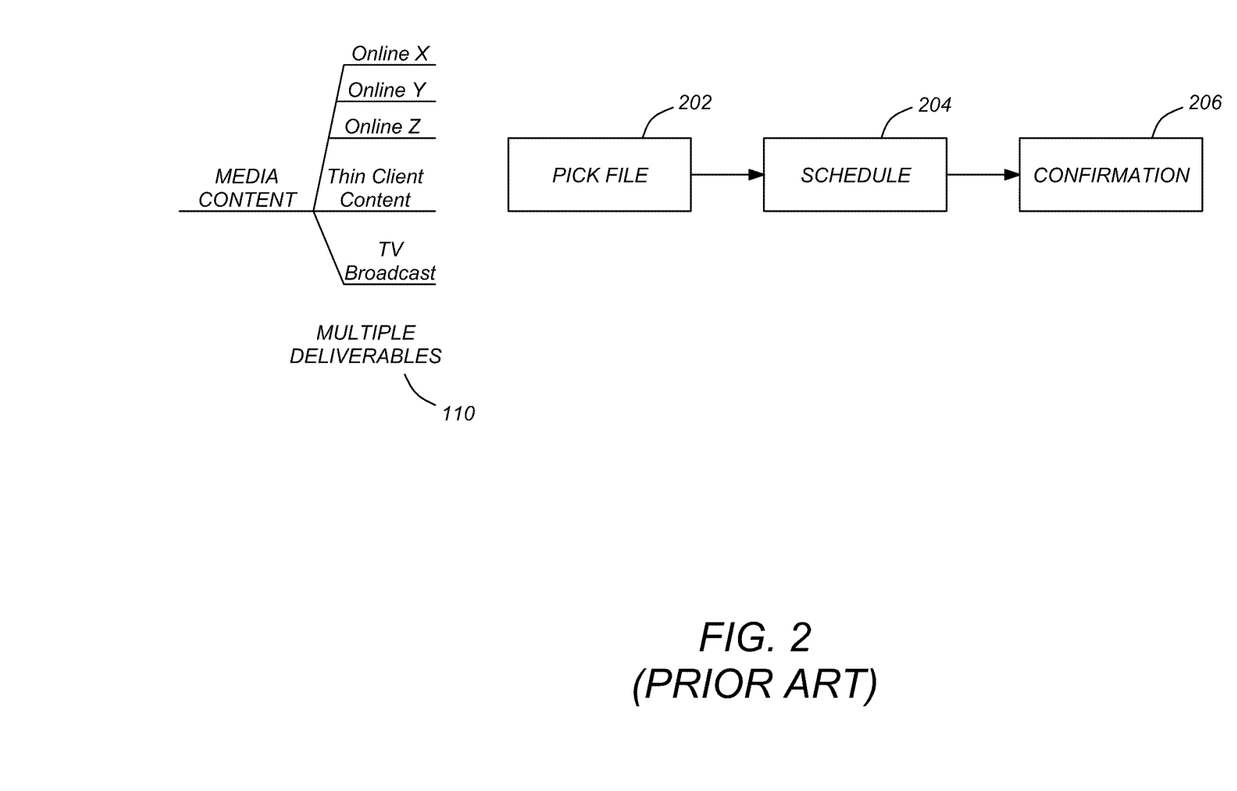
FIG. 2 illustrates the logical flow for delivering a deliverable 110 to a recipient/client in the prior art.

FIG. 2 illustrates the logical flow for delivering a deliverable 110 to a recipient/client in the prior art. At step 202, the user was required to manually pick/select the various file(s)/combination of file(s) to be delivered in an application. In this regard, each deliverable 110 may include various files such as a video file, audio file, metadata, closed-captions, etc. that had to be manually selected.

Once the files have been picked/selected, the user would logon to a portal or delivery mechanism and schedule the delivery of the selected files at step 204. Such a scheduling may be provided using a website, a high speed file transport service (e.g., ASPERA™), or other mechanism. Website/portal based schedulers may only permit a single individual to schedule delivery at any given time. Accordingly, if multiple users are logged into the same scheduler or portal, each person may be forced to wait until another person completes their scheduling activity. In this regard, the prior art capability to perform multi-track scheduling is limited.

Further, to ensure security and prevent inadvertent intrusions into their network from the outside, many facilities physically separate their production network from the outside viewing delivery network (WWW/Internet). This requires that files have to be manually transferred from the internal production network to interim storage, a "digital dock", from where it may then be delivered to the clients. In this regard, the prior art capability to perform the hop from production storage to the digital dock is very limited, and has to be executed manually.

Once scheduling is complete and the deliverable 110 has been delivered, a confirmation of delivery must be forwarded (e.g., via email) at step 206. The configuration and transmission of the confirmation email must also be manually established by the media content owner (or entity that is scheduling the delivery at step 204).

The performance of steps 202-206 consumes a considerable amount of the user's time. In fact, these three steps may consume fifty percent (50%) of the user's overall deliverable creation and transmission process.

In addition to the above, many of the deliverables or other post production tools (utilized in the delivery process) are created using specific third party tools that are not web-based but rely on different protocols (e.g., TCP/IP [transmission control protocol/Internet protocol] and SSH [secure shell network protocol]). Accordingly, post production applications (e.g., an application configured to perform steps 202-206) must be individually configured to accommodate the different third party tools and protocols. Further, as the third party tools change or as new tools are released, the post production applications 202-206 must be individually changed to accommodate the new/modified versions. Further yet, with different machines executing the same post production applications 202-206, job synchronization amongst the different machines and the exclusion of the same third party tool across the different machines is difficult to implement and manage (and may often require a specific job queue).

In view of the above, what is needed is the capability for a post production application to easily, efficiently, and automatically pick, schedule, deliver, and provide delivery confirmation of multiple deliverables.

SUMMARY OF THE INVENTION

One or more embodiments overcome the problems of the prior art utilizing a web service server that provides the functionality that is used to deliver media content utilizing third party delivery tools. An application programming interface (API) for the delivery tool provided by the web service server provides a graphical user interface for the user to specify a show name, world product registry information, and a season for the media content to be delivered. In addition, the user specifies the intended recipients/clients.

Based on the specific user input received, the delivery tool automatically and independently from further user input determines the particular files that are to be delivered to satisfy the user's specifications. Such a determination may utilize client specific template files that enable the easy and automated selection of the files. The identified files are placed into a delivery queue. The delivery queue may enable the use of a fast file transfer service (e.g., Aspera™ web service) or may utilize another delivery mechanism (e.g., file transfer protocol [ftp], secure copy [scp]) and content security provisions (e.g., ssh [secure shell], assymetric or symmetric key encryption schemes, etc.) to deliver the files to the clients/recipients.

The delivery tool is invoked by the delivery queue and it transfers the file-based deliverable from internal production storage onto the externally accessible "digital dock", and then utilizes the aforementioned delivery mechanisms to accomplish the delivery. Additionally, the delivery tool can also be configured, on a per recipient basis, to manage the number of simultaneous transfers to a recipient. This way, a recipient can obtain multiple files simultaneously.

Once delivered, a confirmation email to the client/recipient of the files is automatically generated (e.g., based on an email template file) informing the client/recipient of the successful media content delivery. In the event of a failed delivery, an email is also sent to the operator, so that they may either retry or diagnose the problem.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 3:
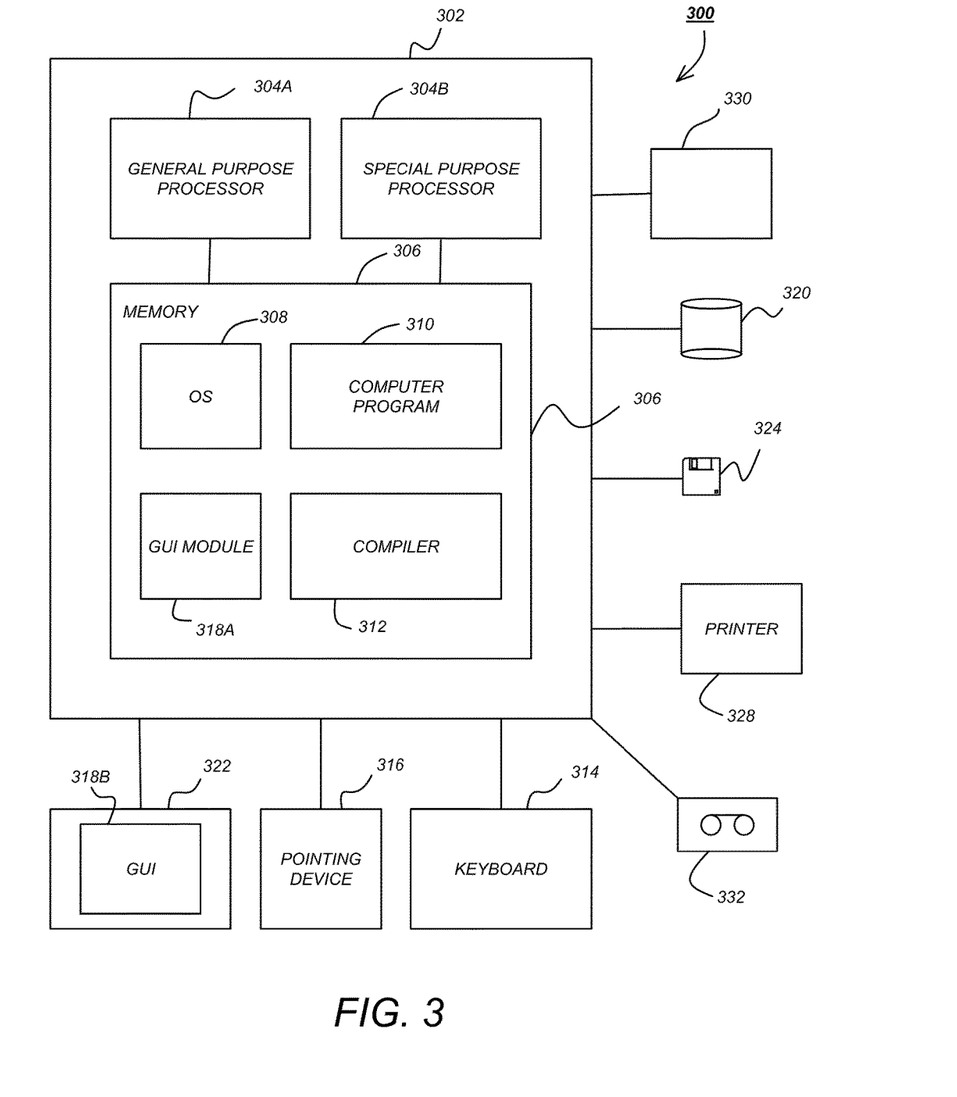
FIG. 3 is an exemplary hardware and software environment used to implement one or more embodiments of the invention.

FIG. 3 is an exemplary hardware and software environment 300 used to implement one or more embodiments of the invention. The hardware and software environment includes a computer 302 and may include peripherals. Computer 302 may be a personal computer, server computer, or may be a database computer. The computer 302 comprises a general purpose hardware processor 304A and/or a special purpose hardware processor 304B (hereinafter alternatively collectively referred to as processor 304) and a memory 306, such as random access memory (RAM). The computer 302 may be coupled to other devices, including input/output (I/O) devices such as a keyboard 314, a cursor control device 316 (e.g., a mouse, a pointing device, pen and tablet, etc.), printer 328, and tape capture device 332.

In one embodiment, the computer 302 operates by the general purpose processor 304A performing instructions defined by the computer program 310 under control of an operating system 308. The computer program 310 and/or the operating system 308 may be stored in the memory 306 and may interface with the user and/or other devices to accept input and commands and, based on such input and commands and the instructions defined by the computer program 310 and operating system 308 to provide output and results.

Output/results may be presented on the display 322 or provided to another device for presentation or further processing or action. In one embodiment, the display 322 comprises a liquid crystal display (LCD) having a plurality of separately addressable liquid crystals. Each liquid crystal of the display 322 changes to an opaque or translucent state to form a part of the image on the display in response to the data or information generated by the processor 304 from the application of the instructions of the computer program 310 and/or operating system 308 to the input and commands. The image may be provided through a graphical user interface (GUI) module 318A. Although the GUI module 318A is depicted as a separate module, the instructions performing the GUI functions can be resident or distributed in the operating system 308, the computer program 310, or implemented with special purpose memory and processors.

Some or all of the operations performed by the computer 302 according to the computer program 310 instructions may be implemented in a special purpose processor 304B. In this embodiment, the some or all of the computer program 310 instructions may be implemented via firmware instructions stored in a read only memory (ROM), a programmable read only memory (PROM) or flash memory within the special purpose processor 304B or in memory 306. The special purpose processor 304B may also be hardwired through circuit design to perform some or all of the operations to implement the present invention. Further, the special purpose processor 304B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 302 may also implement a compiler 312 which allows an application program 310 written in a programming language such as COBOL, Pascal, C++, FORTRAN, or other language to be translated into processor 304 readable code. After completion, the application or computer program 310 accesses and manipulates data accepted from I/O devices and stored in the memory 306 of the computer 302 using the relationships and logic that was generated using the compiler 312.

The computer 302 also optionally comprises an external communication device such as a modem, satellite link, Ethernet card, or other device for accepting input from and providing output to other computers. In this regard, computer 302 may establish or communicate across a network (e.g., Internet) with other computers 300 in a client-server environment. In such a networked environment, applications may execute on either the client or server (or both) and enable GUI 318 to display content from one or multiple computers.

In one embodiment, instructions implementing the operating system 308, the computer program 310, and the compiler 312 are tangibly embodied in a computer-readable medium, e.g., data storage device 320, which could include one or more fixed or removable data storage devices, such as a zip drive, floppy disc drive 324, hard drive, CD-ROM drive, tape drive, etc. Further, the operating system 308 and the computer program 310 are comprised of computer program instructions which, when accessed, read and executed by the computer 302, causes the computer 302 to perform the steps necessary to implement and/or use the present invention or to load the program of instructions into a memory, thus creating a special purpose data structure causing the computer to operate as a specially programmed computer executing the method steps described herein.

Computer program 310 and/or operating instructions may also be tangibly embodied in memory 306 and/or data communications devices 330, thereby making a computer program product or article of manufacture according to the invention. As such, the terms "article of manufacture," "program storage device" and "computer program product" as used herein are intended to encompass a computer program accessible from any computer readable device or media. Thus, embodiments of the invention may be implemented as a method, apparatus, system, or article of manufacture using standard programming and/or engineering techniques to produce software, firmware, hardware, or any combination thereof.

Of course, those skilled in the art will recognize that any combination of the above components, or any number of different components, peripherals, and other devices, may be used with the computer 302.

Although the term "computer" is referred to herein, it is understood that such a computer 302 may include portable devices such as cellular devices (e.g., cell phones), notebook computers, pocket computers, or any other device with suitable processing, communication, and input/output capability.

Figure 4:
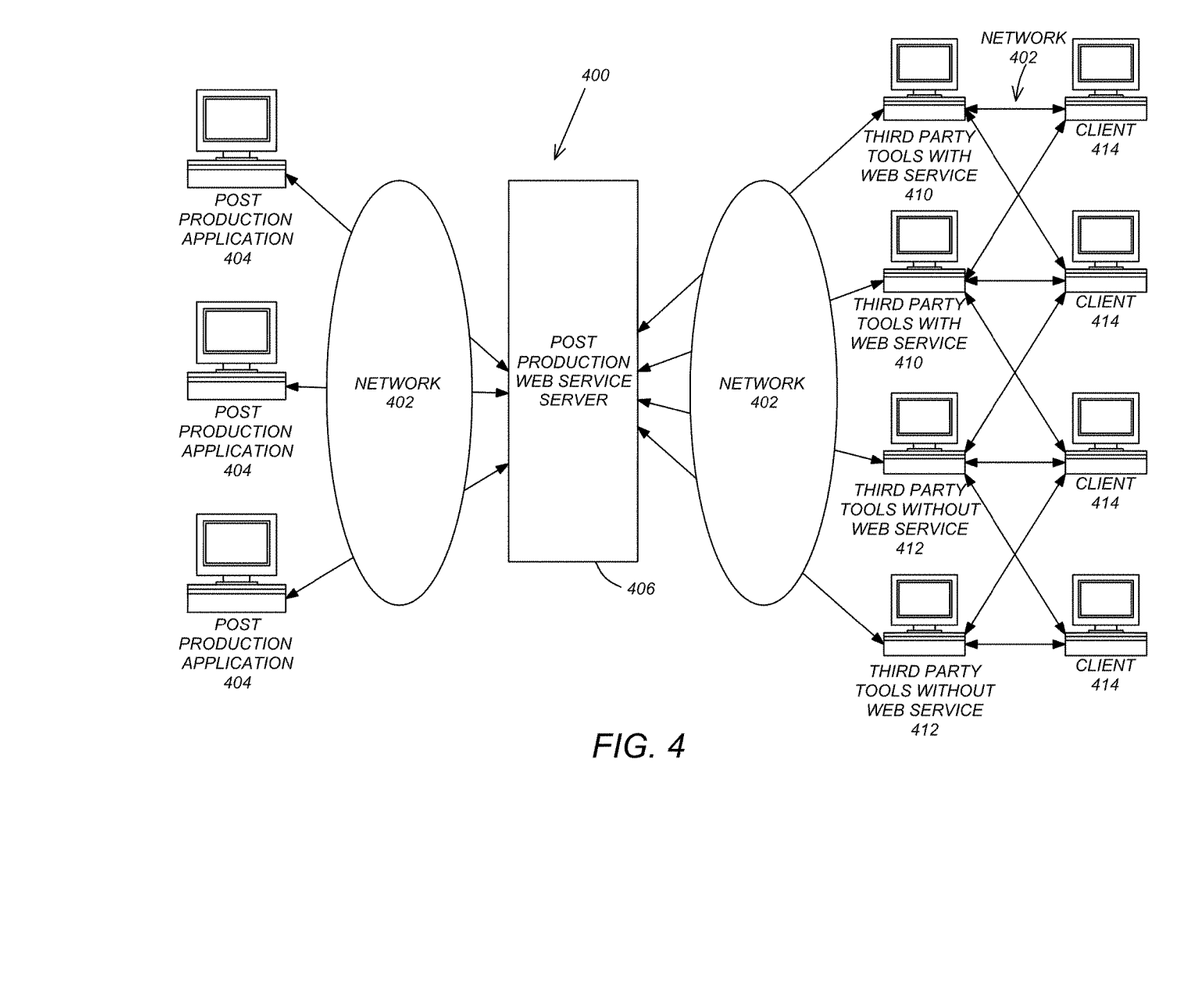
FIG. 4 illustrates a post-production network based environment that may be utilized in accordance with one or more embodiments of the invention.

FIG. 4 illustrates a post-production network based environment that may be utilized in accordance with one or more embodiments of the invention. A typical distributed computer system 400 utilizes a network 402 to connect computers executing post production applications 404 to a server computer 406 serving as a post production web service server. Such communication between post production applications 404 and server 406 may be conducted using extensible markup language (XML). In addition, network 402 connects third party tools with web service 410 (e.g., via XML requests and responses) and without web service 412 (e.g., via TCP/IP sockets) to post production web service server 406. A typical combination of resources may include a network 402 comprising the Internet, LANs (local area networks), WANs (wide area networks), SNA (systems network architecture) networks, or the like, clients 404 and third party tools 410-412 that are personal computers or workstations, and servers 406 that are personal computers, workstations, minicomputers, or mainframes (e.g., as set forth in FIG. 3).

A network 402 such as the Internet connects post production applications 404 and third part tools 410-412 to server computers 406. Additionally, network 402 may utilize radio frequency (RF) to connect and provide the communication between post production applications, third party tools 410-412, and servers 406.

Generally, the applications executed by post production applications 404, third party tools 410-412 and post production web service server 406 all comprise logic and/or data that is embodied in or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

General Software System

The web service server 406 provides a reusable middleware platform for the dynamic integration, selection, and composition by post production applications 404 of third party tools 410-412. All of the tool related code is removed from the post production application 404 and placed into the web service server 406. Whenever the post production application 404 requires some service functionality, the application 404 issues a request to a service type (e.g., a virtual stub) within web service server 406. The web service server 406 translates the request to an available web service 410 or a service composition (i.e., third party tool without web service 412) and sends the result back to the post production application 404. Accordingly, the web service server 406 is placed in between the post production application 404 and the third party tools 410-412. This intermediate layer allows the dynamic selection and integration of tool services into an application and support for rules that govern the selection, integration and composition.

Accordingly, the post production web service server 406 provides web service interfaces to all third party tools with 410/without 412 web service application programming interfaces (APIs). In this regard, the post production server 406 implements the communications/interactions to third party tools 410-412, adds pre-processing/post-processing data, hides all of the special technical details of the third party tools 410-412 from post production applications 404, supplies standard web service APIs to post production applications 404, and inserts the distribution, routing, and filtering logics.

As an overview of FIG. 4, post production applications 404 issue a request to a virtual stub of web service server 406 for a desired service (e.g., delivery of media content to a client 414). Tools 410-412 may deliver to any of one or more clients 414. The web service server 406 provides an API to the tool that satisfies the request and is implemented as a third party tool 410-412 (e.g., a delivery tool). The API allows the post production application 404 to select/enter the appropriate information and receive the results of the requests. However, post production application 404 is merely utilizing an API through web service server 406 and all of the technical details of the third party tool 410-412 are hidden from post production application 404.

Media Content Delivery

Logical Flow and Structure

Figure 5:
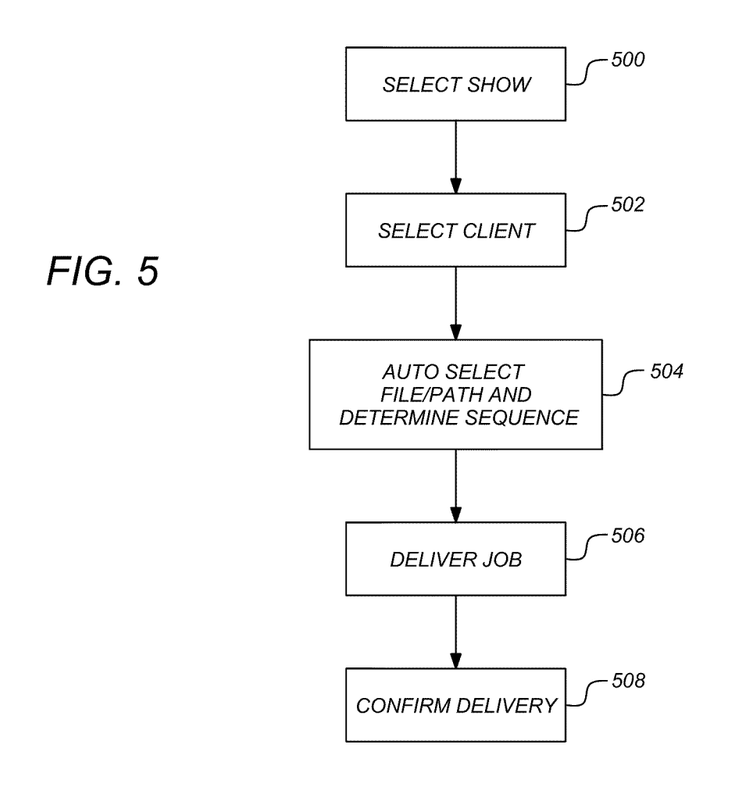
FIG. 5 is a flow chart illustrating the logic for delivering media content in accordance with one or more embodiments of the invention.
Figure 6:
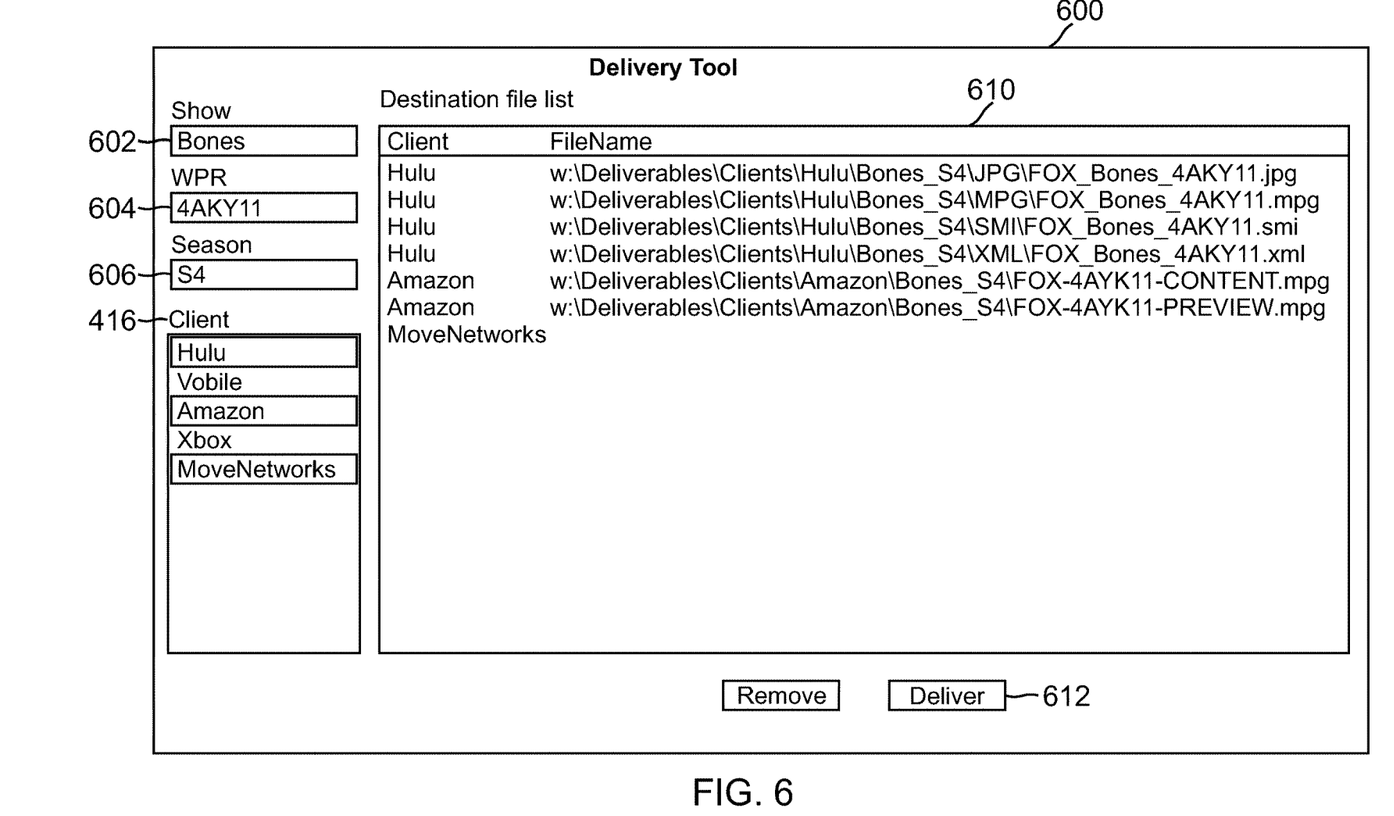
FIG. 6 illustrates a user interface that provides the capability to select and deliver media content to a desired client in accordance with one or more embodiments of the invention.

In one or more embodiments of the invention, media content may be easily delivered to multiple different entities/clients 414 using the software system described above. FIG. 5 is a flow chart illustrating the logic for delivering media content in accordance with one or more embodiments of the invention. FIG. 6 illustrates a user interface 600 that provides the capability to select and deliver media content to a desired client in accordance with one or more embodiments of the invention. The logic of FIG. 5 will be described with respect to FIG. 6.

At step 500, a specific show name 602, WPR number 604 (worldwide product registry number—a six [6] digit alpha-numeric identification for a particular media content), and/or season 606 are accepted/selected (e.g., via user input). The end user may have the option to enter a wildcard such as an asterisk ("*") to indicate the scope or range in input fields 602-606. Accordingly, step 500 provides for selecting the media content (e.g. using a graphical user interface to receive user input).

At step 502, one or more specific clients 416 that are going to receive the selected show/media deliverable 602-606 is identified/selected. For example, as illustrated in FIG. 6, the user has selected Hulu™, Amazon™, and MoveNetworks™ as the clients 416 that will be receiving the selected media content identified in boxes 602-606.

Once the show 602-606 and client 608 has been selected, the delivery tool automatically (e.g., without additional user input or independently from user actions) calculates and determines the corresponding paths of the directories and/or files that are going to be sent as part of the package for each identified client 416 (i.e., at step 504) (i.e., based on the selected media content and selected clients 416). Further, a specific order or sequence may be required as part of the delivery sequence. Such an order/sequence is also determined/specified at step 504. For example, a client 416 may process files and have file dependencies such that one file is required to be processed before another file processing can commence. Accordingly, certain higher priority files may be delivered first to enable the appropriate sequence of processing by client 416. Such a sequence is automatically determined and established using the delivery tool at step 504.

During step 504, if the directories or files identified exist, the delivery tool will automatically (i.e., independent from or without additional user action) place the files into a destination file list 610. If the directories/files do not exist, a file browser graphical user interface may displayed that provides the capability for the user to select the appropriate delivery directory or file which can then be added to destination file list 610. A client configuration file (discussed in detail below) may be utilized to determine the files and the order of the files that are selected at step 504.

Once the delivery directories and/or files have been selected at step 504, the user may then click on the deliver button 612 to submit the delivery jobs to the web service server 406 for delivery to the specified clients 416 at step 506. In this regard, step 506 provides for scheduling the one or more files in the destination file list 610 for delivery to the selected clients 416.

The delivery web service commands the initial operation of transferring the data from the internal production storage to the externally visible storage "digital dock". In other words, the delivery consists of the automatic transfer of the files from the closed internal network's storage to an externally accessible network's temporary storage. Once the transfer is complete, the appropriate delivery protocol is initiated to accomplish the transfer.

Once the delivery jobs (i.e., files in the destination file list 610) have been delivered to clients 416, the delivery (of the one or more files 610) is confirmed at step 508 (e.g., via an email to the requesting client 416).

Delivery Database

To enable the delivery process of FIG. 5 and the user interface of FIG. 6, various tables and configuration files may be utilized. In this regard, a delivery database (e.g., a relational database) may be implemented and utilized by the web service server 406 or third party tools 410-412. The delivery database is used to contain all of the delivery data. There are five basic data structures/tables utilized to maintain the delivery data: (1) a client configuration table; (2) a delivery status table; (3) a file delivery table; (4), a status reference table; and (5) a delivery mechanism reference table. User interfaces may be provided to edit and view the data in these tables.

The client configuration table stores the configuration of the clients 416 including a client identification (ID), client name, host name, user name, password (to enable a logon for delivery to a specified location if necessary), ssh_security_key, destination directory, delivery mechanism ID, and proxy machine.

The delivery status table maintains the active data of delivery jobs. After a delivery job is completed, its data is moved from the delivery status table to the file delivery table to keep track of the operation history. The delivery status table may include one or more of the following fields: client ID; files/directories; status ID; progress; priority (default: 500, highest priority: 1, priority to disable the job: 9999); operator; and date.

The file delivery table is a history/transaction table to store completed delivery jobs and may include one or more of the following field: client ID; files/directories; status ID; progress; priority (default 500, highest priority: 1, priority to disable the job: 9999); operator; and date.

The status reference table simply provides a listing of the available statuses available for use by the delivery status table and file delivery table and may include a status ID (the primary key utilized to access the delivery status table and file delivery table) and a status.

The delivery mechanism reference table provides a listing of the available mechanisms that may be utilized to perform a delivery to a client and may include a mechanism ID (as a primary key into the client configuration table) and name.

Delivery Job Queue

The delivery job queue is a queue for the delivery (to clients 414) of the files in the destination file list 610. The delivery job queue is built on the delivery status table in the web service server 406. For each delivery file/package, the delivery tool submits a delivery job to this queue.

The queue may utilize a FIFO (first in first out) model for the jobs having the same priority. However, higher priority jobs may be placed ahead of other low priority jobs in the queue.

Each job in the queue may have one of several statuses including initialed, waiting, running, completed, or failed on error. If a delivery job depends on the completeness of other jobs, it may be placed in the "waiting" state. If the status of a job is "completed", it will be moved to the "File Delivery Table" described above.

Figure 7:
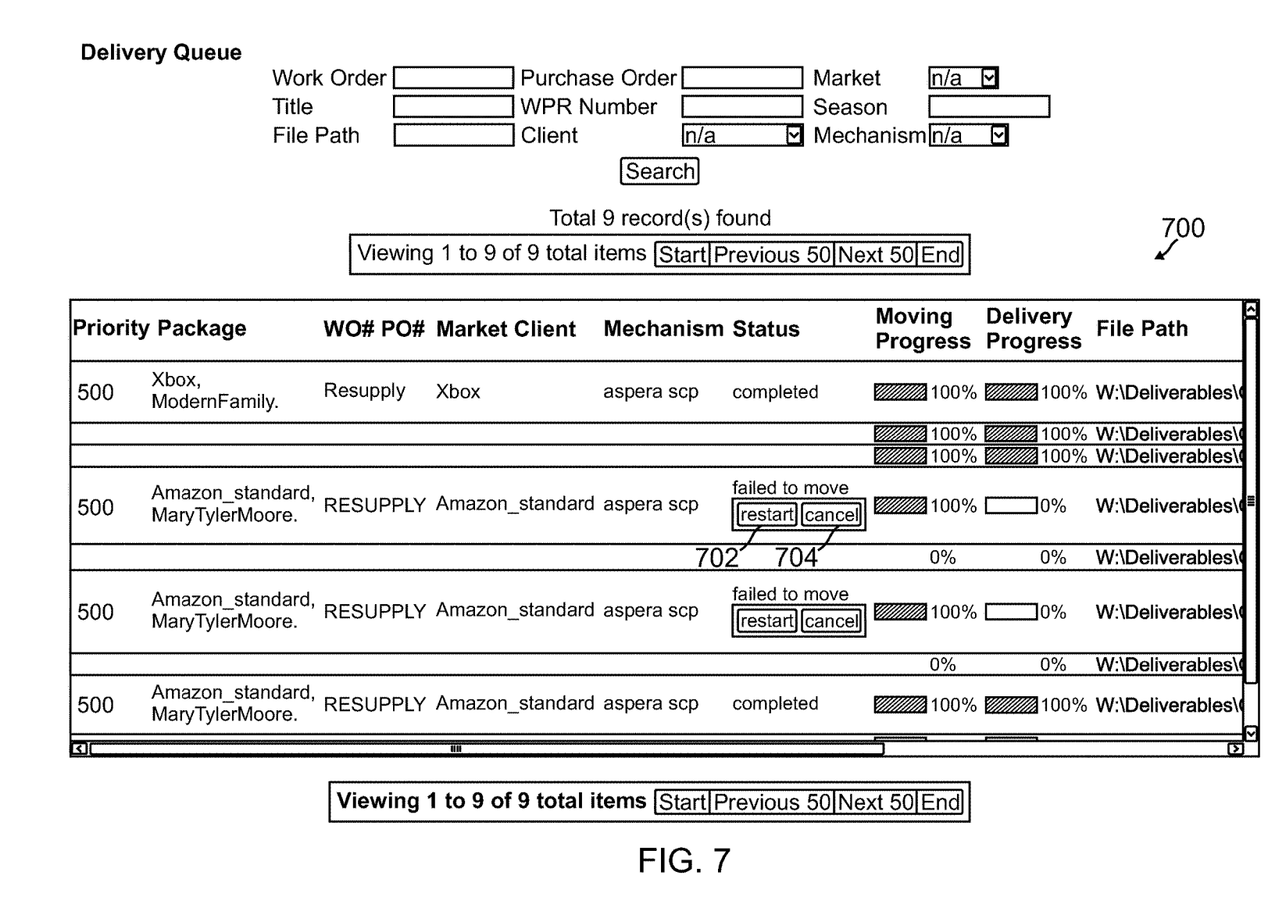
FIG. 7 illustrates a user interface that provides the capability to restart or cancel deliveries that are in progress or have stalled in accordance with one or more embodiments of the invention.

A child process may be spawned for each job and is responsible for updating the job status. The number of child processes (jobs in parallel) may have a limitation (e.g., 10 at a time) based on network bandwidth but can easily be expanded. Further, users may have the capability (via a graphical user interface) of monitoring and editing the priority in the queue. Such a monitoring capability is illustrated by the graphical user interface shown in FIG. 7 in accordance with one or more embodiments of the invention. Additionally, the graphical user interface 700 provides a mechanism to restart a failed job and/or cancel jobs that are running or waiting (e.g., using restart and/or cancel buttons 702 and 704).

Client Configuration File

For each client 414, a configuration file establishes the settings necessary for delivering and confirming delivery to that particular client 414. In this regard, the delivery tool (e.g., third party tools 410-412) needs the client configuration files from the web service server 406 to implement automations such as confirmation email and the delivery file/directory navigation.

The client configuration files specify: (a) the type of files needed for a particular deliverable/client 414 (e.g., MPG, JPG, close captioned file (SMI), and an XML [where chapter, stops, etc. are located]); (b) a sequence/order for delivering the various types of files (e.g., some deliverables may be required to be delivered before another deliverable); (c) the recipient and the protocol used to deliver to that recipient (e.g., TCP, FTP, etc.); (d) an autoqueue for queuing the processing for delivery of the different deliverables; and (e) an auto confirmation (e.g., an email template for transmitting confirmation messages to the recipient when a deliverable has been delivered [e.g., is available for download at a specified ftp site]). A client configuration file may have multiple parts including a confirmation email template file and/or a client delivery file/path template file.

The confirmation email template file sets forth the settings for transmitting an email to the receiving client 414 that confirms the successful delivery of the deliverable/media content to the specified client 414 location. Accordingly, the confirmation email template is defined for a specific client consisting of the invariables such as email addresses and variables for keywords such as the filename (i.e., "$$fileNames$$") or show name (i.e., "$$showName$$"). When sending a confirmation email to the client 414 for the success of a specific file delivery, these keywords are substituted by the delivery tool with the corresponding values for the successful delivery (e.g., with the information specified in fields 602-606 and/or 610). Table A illustrates a sample of an email template for a client 414 such as "Hulu".

TABLE A

From: jon.smith@fox.com
To: ingest@hulu.com; qa@hulu.com; ...
Cc:
Subject: client1 - Delivery Confirmation - $$showName$$ $$wprNumber$$
The following have been uploaded to the "Fox" Aspera account:
$$fileNames$$
Thanks!
$$operator$$
--------------------------------------------------
Jon Smith
Digital Media Operator
20th Century Fox - Video Services
310-867-5309
Please do not reply to this automated email.

In Table A, the from and to addressees are identified. In the email subject, the variables "$$showName$$" and "$$wprNumber$$" will be replaced with the show name 602 and WPR number 604 specified by the user in GUI 600. Such replacement occurs automatically without the user manual replacing or configuring the email. The email body includes the list of filenames identified in the destination file list 610 for the particular client 414 (e.g., Hulu™) and the variable signature "$$operator$$" will be replaced with the appropriate person. Accordingly, Table A provides a template that is used by the delivery tool to compose an email that is transmitted to the client 414 confirming delivery of the specified files 610.

The client delivery template file provides one or more path patterns of the one or more files 610 (to be delivered), where the path patterns include keywords (for each pattern) that are substituted with information identifying the selected media content 602-606 to select the one or more files 610.

The information identifying the selected media content may include media content identifiers that are received via user input. In addition, a sequence for delivering the files 610 may be specified in the client delivery template file. Further, the client delivery template file may specify a protocol to utilize for delivering the files 610 (e.g., TCP, FTP, a fast transfer tool such as Aspera™, etc.) and information necessary for delivering the files 610 using the protocol (e.g., username and password to logon to a website or third party tool enabling the delivery).

More specifically, similar to the email template of Table A, a client delivery file/path template file may provide the path patterns of the source files or packages that are inserted into the destination file list 610 automatically (i.e., independent from user action beyond selection of the appropriate client 416 in GUI 600). In this regard, variables such as "$$showName$$", "$$season$$", and $$wprNumber$$" in the client delivery file/path template may be replaced with the actual show name 602, WPR number 604, and/or season 606 when utilized/activated. In this regard, the delivery tool may require the end users to input the show name 602 and WPR number 604 for a delivery and the tool will then automatically determine the path and file names by substituting the keywords in the template file. An example of a client delivery file/path template file for a client 414 such as Hulu™ is illustrated in Table B:

TABLE B

/Deliverables/Client/Hulu/$$showName$$_$$season$$/MPG/
FOX_$$showName$$_$$wprNumber$$.mpg
/Deliverables/Client/Hulu/$$showName$$_$$season$$/JPG/
FOX_$$showName$$_$$wprNumber$$.jpg
/Deliverables/Client/Hulu/$$showName$$_$$season$$/smi/
FOX_$$showName$$_$$wprNumber$$.smi
/Deliverables/Client/Hulu/$$showName$$_$$season$$/xml/
FOX_$$showName$$_$$wprNumber$$.xml As illustrated in Table B, the "$$" delimeters identify the variables that will be replaced with the information specified by the user. Using the template of Table B, destination file list 610 of FIG. 6 identifies the different delivery files/paths that are automatically inserted/scheduled for delivery by the delivery tool using the information specified in fields 602-606 for various clients including Hulu™. In this regard, as one or more clients 414 are selected by a user, the delivery tool will automatically calculate the corresponding paths of the directories or files by replacing the variables identified with the "$$" delimeters in the "client delivery file/path template file of Table B.

An asterisk ("*") may be used as a wildcard in the path pattern to represent a range of all possible characters in the file names. For instance, to deliver all kinds (e.g., "content" and "preview") of files of a show to a client 414 such as Amazon™, the following pattern may be utilized:

/Deliverables/Client/Amazon/$$showName$$_$$season$$/FOX-$$wprNumber$$-*.mpg

In addition, the client delivery file/path template file may be used to specify a sequence/order for delivering one or more files. A colon (":") may be utilized to indicate the delivery dependencies on other deliveries. For example, the file may utilize pairs of colons and file names at the end of the path pattern to require deliveries as a pre-condition for a specified delivery. Such notation would provide that the specified delivery would not commence until the required deliveries are completed. For instance, to specify "smi" and "xml" files should be delivered before an "mpg" file, the notation in Table C may be utilized:

TABLE C

/Deliverables/Client/Hulu/$$showName$$_$$season$$/smi/
FOX_$$showName$$_$$wprNumber$$.smi
/Deliverables/Client/Hulu/$$showName$$_$$season$$/xml/
FOX_$$showName$$_$$wprNumber$$.xml
/Deliverables/Client/Hulu/$$showName$$_$$season$$/MPG/
FOX_$$showName$$_$$wprNumber$$.mpg:/Deliverables/
Client/Hulu/$$showName$$_$$season$$/smi/
FOX_$$showName$$_$$wprNumber$$.smi:/Deliverables/
Client/Hulu/$$showName$$_$$season$$/xml/
FOX_$$showName$$_$$wprNumber$$.xml As illustrated in Table C, the first line specifies the directory and name of the "smi" file. The second line specifies the directory and name of the "xml" file. The third line specifies the sequence/ordering with "mpg" listed first followed by a ":", the "smi" file followed by a ":", and concluding with the "xml" file. Accordingly, the "smi" file and "xml" file must be delivered before the "mpg" file.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, one or more embodiments of the invention provide the ability to deliver a file (that has been encoded) to various customers/clients 414. A configuration is established for each client that specifies: (a) types of files needed for a particular deliverable/client 414 (e.g., MPG, JPG, close captioned file (SMI), and an XML [where chapter, stops, etc. are]); (b) sequence/order for delivering the various types of files (e.g., some deliverables may be required to be delivered before another deliverable); (c) recipient and the protocol used to deliver to that recipient (e.g., TCP, FTP, etc.). This information may also include username and password info if necessary to enable delivery of the media content (e.g., to log into a website where the content is uploaded); (d) autoqueue for queuing the processing for delivery of the different deliverables; and (e) auto confirmation—an email template for transmitting confirmation messages to the recipient when a deliverable has been delivered (e.g., is available for download at a specified ftp site), and/or also when delivery was not possible (failure).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for delivering a media content deliverable, comprising:
    (a) selecting, via a graphical user interface, the media content;
    (b) selecting and simultaneously displaying, via the graphical user interface, multiple entities that will receive the selected media content, wherein the multiple entities have different format requirements for the media content, and wherein the multiple entities comprise customer recipients;
(c) independently from additional user input, automatically and dynamically selecting one or more files based on the selected media content, the multiple selected entities, and the different format requirements;
(d) displaying, in the graphical user interface, a list of the one or more files to be delivered to the multiple selected entities;
(e) scheduling the one or more files for delivery to the multiple selected entities; and
(f) automatically confirming to the multiple selected entities, without additional user input in response to delivery of the one or more files, delivery of the one or more files to the multiple selected entities.

2. The method of claim 1, wherein the selecting the media content comprises accepting user input in the graphical user interface, wherein the user input selects a show name, a worldwide project registry (WPR) number, and a season.

3. The method of claim 1, wherein the selecting the one or more files comprises utilizing a client delivery template file, for each of the multiple selected entities, to identify the one or more files, wherein:
the client delivery template file comprises one or more path patterns of the one or more files;
the one or more path patterns comprise one or more keywords, for each pattern, that are substituted with information identifying the selected media content to select the one or more files.

4. The method of claim 3, wherein the information identifying the selected media content comprises media content identifiers received via user input.

5. The method of claim 3, wherein the client delivery template file further specifies a sequence for delivering the one or more files.

6. The method of claim 3, wherein the client delivery template file further specifies:
a protocol to utilize for delivering the one or more files; and
information necessary for delivering the one or more files utilizing the protocol.

7. The method of claim 1, wherein a delivery of the one or more files comprises automatically transferring the files from a closed internal network's storage to an externally accessible network's temporary storage.

8. The method of claim 1, wherein the scheduling the one or more files comprises automatically placing the one or more files in a delivery queue for delivery of the one or more files to the multiple selected entities.

9. The method of claim 1, wherein the confirming delivery comprises utilizing a confirmation email template file, for each of the multiple selected entities, that defines a format for an email to be transmitted to the multiple selected entities confirming successful delivery, wherein the confirmation email template file comprises:
one or more invariables; and
one or more variables comprised of keywords that are substituted with corresponding successful delivery values.

10. A system for delivering a media content deliverable in a computer system comprising:
(a) a computer having a memory; and
(b) an application executing on the computer, wherein the application is configured to:
(i) select, in a graphical user interface, the media content;
(ii) select and simultaneously display, in the graphical user interface, multiple entities that will receive the selected media content, wherein the multiple entities have different format requirements for the media content, and wherein the multiple entities comprise customer recipients;
(iii) independently from additional user input, automatically and dynamically select one or more files based on the selected media content, the multiple selected entities, and the different format requirements;
(iv) display, in the graphical user interface, a list of the one or more files to be delivered to the multiple selected entities;
(v) schedule the one or more files for delivery to the multiple selected entities; and
(vi) automatically confirm to the multiple selected entities, without additional user input in response to delivery of the one or more files, delivery of the one or more files to the multiple selected entities.

11. The system of claim 10, wherein the application is configured to select the media content by accepting user input in the graphical user interface, wherein the user input selects a show name, a worldwide project registry (WPR) number, and a season.

12. The system of claim 10, wherein the application is configured to select the one or more files by utilizing a client delivery template file, for each of the multiple selected entities, to identify the one or more files, wherein:
the client delivery template file comprises one or more path patterns of the one or more files;
the one or more path patterns comprise one or more keywords, for each pattern, that are substituted with information identifying the selected media content to select the one or more files.

13. The system of claim 12, wherein the information identifying the selected media content comprises media content identifiers received via user input.

14. The system of claim 12, wherein the client delivery template file further specifies a sequence for delivering the one or more files.

15. The system of claim 12, wherein the client delivery template file further specifies:
a protocol to utilize for delivering the one or more files;
information necessary for delivering the one or more files utilizing the protocol.

16. The system of claim 10, wherein the computer is configured to deliver the one or more files by automatically transferring the files from a closed internal network's storage to an externally accessible network's temporary storage.

17. The system of claim 10, wherein the application is configured to schedule the one or more files by automatically placing the one or more files in a delivery queue for delivery of the one or more files to the multiple selected entities.

18. The system of claim 10, wherein the application is configured to confirm delivery by utilizing a confirmation email template file, for each of the multiple selected entities, that defines a format for an email to be transmitted to the multiple selected entities confirming successful delivery, wherein the confirmation email template file comprises:
one or more invariables; and
one or more variables comprised of keywords that are substituted with corresponding successful delivery values.

19. A non-transitory computer readable storage medium encoded with computer program instructions which when accessed by a computer cause the computer to load the program instructions to a memory therein creating a special purpose data structure causing the computer to operate as a specially programmed computer, executing a method of delivering a media content deliverable, comprising:
- (a) selecting, in the specially programmed computer, via a graphical user interface, the media content;
- (b) selecting and simultaneously displaying, in the specially programmed computer, via the graphical user interface, multiple entities that will receive the selected media content, wherein the multiple entities have different format requirements for the media content, and wherein the multiple entities comprise customer recipients;
- (c) independently from additional user input, automatically and dynamically selecting, in the specially programmed computer, one or more files based on the selected media content and the multiple selected entities;
- (d) displaying, in the graphical user interface, a list of the one or more files to be delivered to the multiple selected entities;
- (e) scheduling, in the specially programmed computer, the one or more files for delivery to the multiple selected entities; and
- (f) automatically confirming to the multiple selected entities, in the specially programmed computer, without additional user input in response to delivery of the one or more files, delivery of the one or more files to the multiple selected entities.

20. The non-transitory computer readable storage medium of claim 19, wherein the selecting the media content comprises accepting, in the specially programmed computer, user input in the graphical user interface, wherein the user input selects a show name, a worldwide project registry (WPR) number, and a season.

21. The non-transitory computer readable storage medium of claim 19, wherein the selecting the one or more files comprises utilizing, in the specially programmed computer, a client delivery template file, for each of the multiple selected entities, to identify the one or more files, wherein:
the client delivery template file comprises one or more path patterns of the one or more files; and
the one or more path patterns comprise one or more keywords, for each pattern, that are substituted with information identifying the selected media content to select the one or more files.

22. The non-transitory computer readable storage medium of claim 21, wherein the information identifying the selected media content comprises media content identifiers received via user input.

23. The non-transitory computer readable storage medium of claim 21, wherein the client delivery template file further specifies a sequence for delivering the one or more files.

24. The non-transitory computer readable storage medium of claim 21, wherein the client delivery template file further specifies:
a protocol to utilize for delivering the one or more files; and
information necessary for delivering the one or more files utilizing the protocol.

25. The non-transitory computer readable storage medium of claim 19, wherein a delivery of the one or more files comprises automatically transferring the files from a closed internal network's storage to an externally accessible network's temporary storage.

26. The non-transitory computer readable storage medium of claim 19, wherein the scheduling the one or more files comprises automatically placing, in the specially programmed computer, the one or more files in a delivery queue for delivery of the one or more files to the multiple selected entities.

27. The non-transitory computer readable storage medium of claim 19, wherein the confirming delivery comprises utilizing, in the specially programmed computer, a confirmation email template file, for each of the one or more selected entities, that defines a format for an email to be transmitted to the multiple selected entities confirming successful delivery, wherein the confirmation email template file comprises:
one or more invariables; and
one or more variables comprised of keywords that are substituted with corresponding successful delivery values.

* * * * *